US011898996B2

(12) United States Patent
Yang

(10) Patent No.: US 11,898,996 B2
(45) Date of Patent: Feb. 13, 2024

(54) TEST SYSTEM WITH DETECTION FEEDBACK

(71) Applicant: Teng-Jen Yang, Taichung (TW)

(72) Inventor: Teng-Jen Yang, Taichung (TW)

( * ) Notice: Subject to any disclaimer, the term of this patent is extended or adjusted under 35 U.S.C. 154(b) by 174 days.

(21) Appl. No.: 17/567,159

(22) Filed: Jan. 3, 2022

(65) Prior Publication Data

US 2023/0213424 A1    Jul. 6, 2023

(51) Int. Cl.
*G01N 3/56* (2006.01)
*A43B 5/00* (2022.01)
*B25J 19/02* (2006.01)
*G01N 3/06* (2006.01)

(52) U.S. Cl.
CPC .............. *G01N 3/56* (2013.01); *A43B 5/00* (2013.01); *B25J 19/02* (2013.01); *G01N 3/062* (2013.01)

(58) Field of Classification Search
CPC ............ G01N 3/56; G01N 3/062; A43B 5/00; B25J 19/02
See application file for complete search history.

(56) References Cited

U.S. PATENT DOCUMENTS

2019/0369005 A1 * 12/2019 Gray ................. A43D 1/08
2020/0398424 A1 * 12/2020 Hane ................. B25J 9/1674

FOREIGN PATENT DOCUMENTS

| CN | 110505947 A | * | 11/2019 | ............. B25J 13/00 |
| CN | 109807896 B | * | 5/2021 | |
| CN | 109986559 B | * | 8/2021 | |
| JP | 2019111604 A | * | 7/2019 | |

* cited by examiner

*Primary Examiner* — Curtis A Kuntz
*Assistant Examiner* — James E Munion
(74) *Attorney, Agent, or Firm* — Bruce Stone LLP; Joseph A. Bruce

(57) ABSTRACT

A test system with detection feedback works with a robot to which a test object is attached. The test system includes a server and a force sensor disposed to the robot. The server controls the robot to drive the test object to contact a test platform while the force sensor detects at least one reaction force on the test object to generate a sensing feedback signal for the server. When the reaction force corresponding to a direction and indicated by the sensing feedback signal does not match a force setting value, the server adjusts a level to which the robot drives the test object to move relative to the test platform so that the reaction force corresponding to the direction can match the force setting value. Therefore, the resistance acting on the test object moving relative to the test platform may be automatically maintained at the preset degree.

6 Claims, 3 Drawing Sheets

TEST SYSTEM WITH DETECTION FEEDBACK

BACKGROUND

Field of the Invention

The present invention relates to a test system, and more particularly to a test system with detection feedback.

Description of Related Art

Most of the existing shoe sole testing mechanisms use testing machines to test the properties of the test soles (such as but not limited to wear resistance, toughness or structural strength, etc.) by directly and repeatedly pressing, beating, pulling or rubbing the test soles). However, this traditional test method is designed not by imitating the user's actual use conditions, so it is relatively impossible to test the test soles for the properties they will express in actual use.

In order to test a test sole for the properties the test sole will express in actual use, another test method was proposed on the market. In this test method, a real person is appointed to directly put on a shoe sample, to which the test sole is arranged, and perform various actions; and the properties of the test sole is then analyzed by observing the condition of the test sole after a long period of actual use. However, this test method relying upon real persons is not only expensive in personnel costs, but also time-consuming due to human limitations, and is also prone to interruption or suspension of the testing process due to other force majeure factors (such as epidemic situations).

SUMMARY

To this end, one objective of the present invention is to provide a test system with detection feedback to perform high-fidelity testing, so that the movement of a test object relative to a test platform can automatically conform to the presetting. Moreover, labor costs may be saved and the testing efficiency may also be increased.

A test system with detection feedback in accordance with an embodiment of the invention is suitable for working with a robot, a test object is attached to the robot, and the test system comprises: a force sensor configured to be installed on the robot to detect at least one reaction force on the test object, so as to generate a sensing feedback signal; and a server electrically connected to the robot and the force sensor, and the server configured to: according to a force setting value corresponding to a direction, control the robot to drive the test object to move so that the test object contacts a test platform; receive the sensing feedback signal of the force sensor to compare the reaction force corresponding to the direction and indicated by the sensing feedback signal, with the force setting value; and adjust a degree to which the robot drives the test object to move relative to the test platform in the direction when the reaction force corresponding to the direction does not match the force setting value, so that the reaction force corresponding to the direction matches the force setting value.

In some embodiments, the server further controls a motion of the robot according to a motion parameter sequence, the motion parameter sequence includes at least one parameter associated with the direction, and when the reaction force corresponding to the direction does not match the force setting value, the server adjusts the at least one parameter associated with the direction, so as to adjust the degree to which the robot drives the test object to move relative to the test platform. Alternatively, the server adjusts a movement speed of the robot, thereby adjusting the degree to which the robot drives the test object to move relative to the test platform in the direction.

In some embodiments, the motion parameter sequence is designed to simulate a body motion of human being.

In some embodiments, the force sensor is a multi-axis force sensor.

In some embodiments, the force sensor is a 6-axis force sensor.

In some embodiments, the test system further comprises a user interface communicatively connected to the server to present information associated with the at least one reaction force.

In some embodiments, the test system further comprises a camera electrically connected to the server for shooting the test object to generate a test image for the server to display the test image on the user interface.

In this way, the test system provided by the present invention not only uses the robot to drive the test object to move relative to the test platform, but also uses the feedback signal provided by the force sensor to determine whether the reaction force on the test object reaches the expected value, so as to adjust the movement of the robot accordingly. Therefore, the resistance applied to the test object contacting the test platform will not be unexpectedly reduced over time, but can continue to match the setting value.

BRIEF DESCRIPTION OF THE DRAWINGS

After studying the detailed description in conjunction with the following drawings, other aspects and advantages of the present invention will be discovered.

DETAILED DESCRIPTION

In the following detailed description, many specific details are explained in order to provide a thorough understanding of the present invention. However, those of ordinary skill in the art will understand that the present invention can be practiced without these specific details. In other cases, well-known methods, procedures and/or elements have not been described in detail so as not to obscure the present invention.

Figure 1:
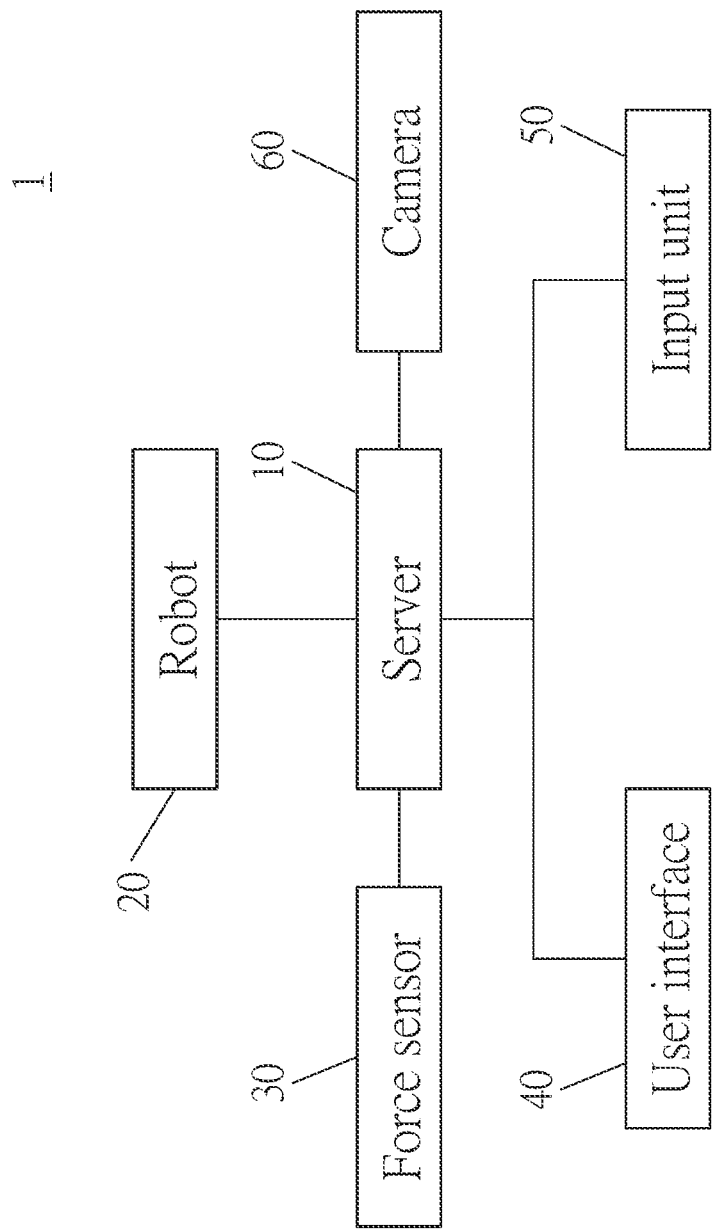
FIG. 1 is a functional block diagram of a test system with detection feedback according to an embodiment of the present invention.
Figure 2:
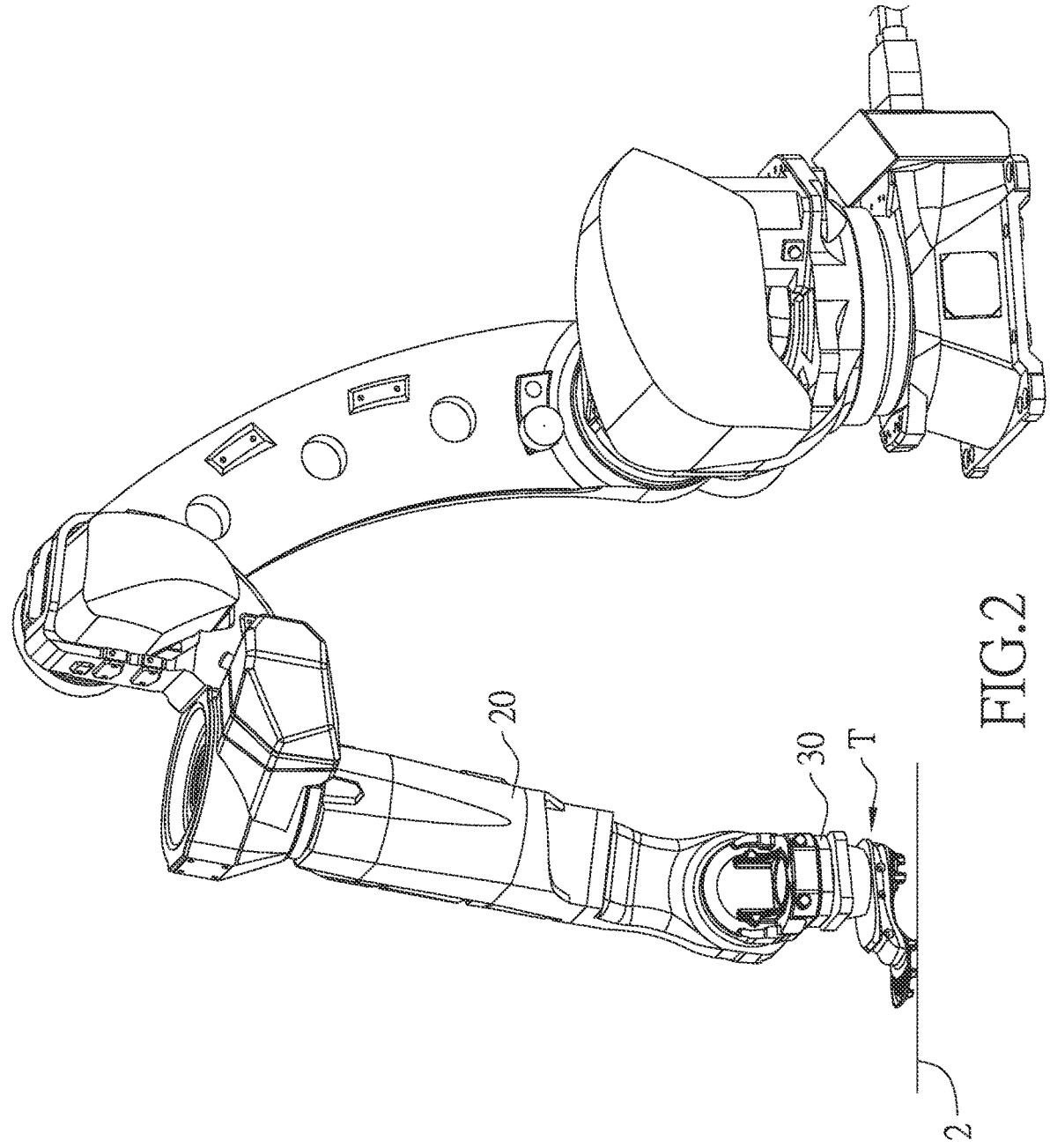
FIG. 2 is a schematic diagram of a test system with detection feedback in conjunction with a force sensor and a test object according to an embodiment of the present invention.
Figure 3:
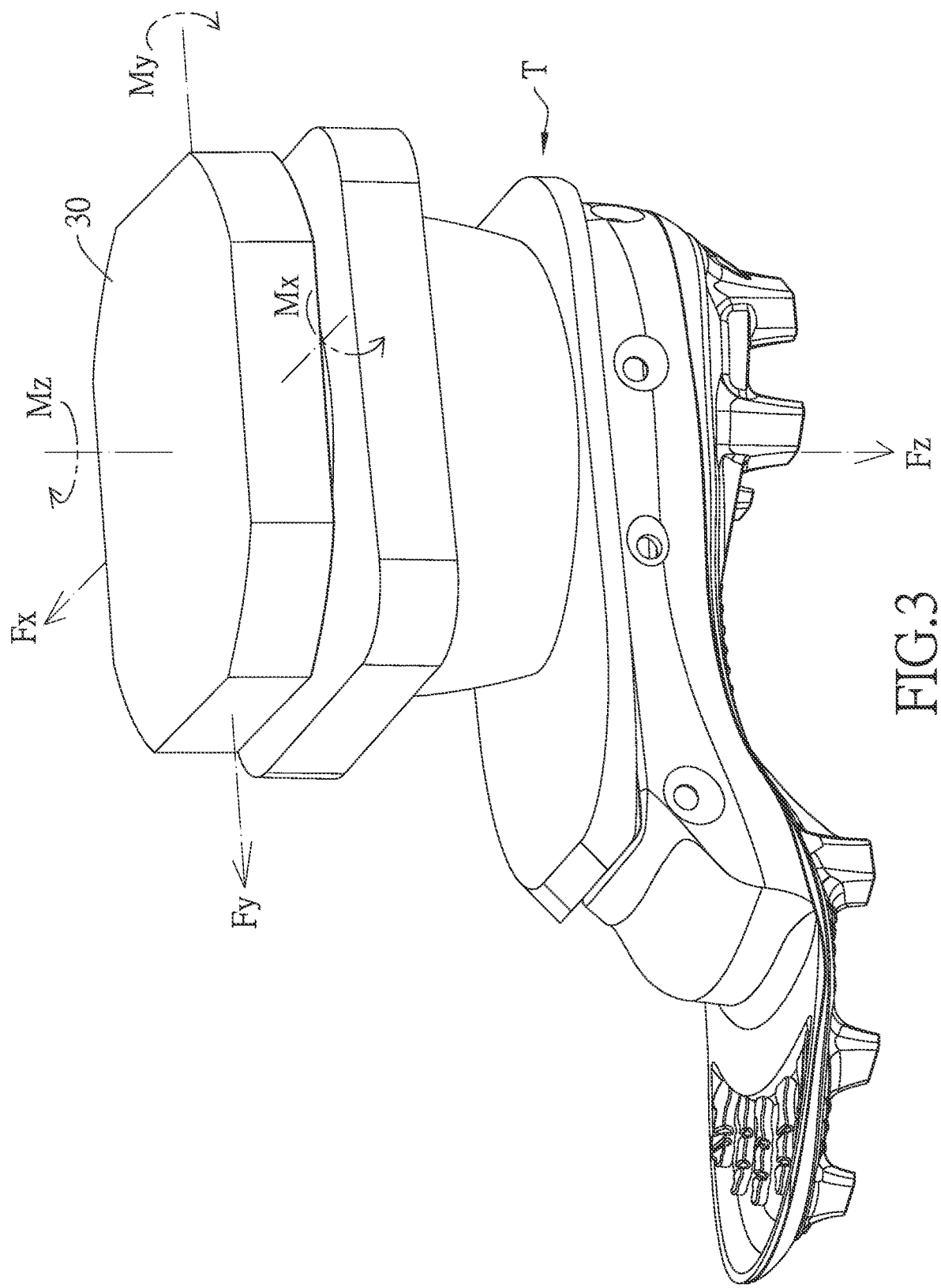
FIG. 3 is a schematic diagram according to an embodiment of the present invention showing a force sensor arranged on a test object for the force sensing.

Please refer to FIGS. 1 to 3, a test system 1 with detection feedback according to an embodiment of the present invention is suitable for simulating the state of a test object T being used by a real person, and can also perform a test task on the test object T at the same time. The test system 1 essentially includes a server 10, a robot 20, at least one force sensor 30, a user interface 40, an input unit 50 and a camera 60. The server 10 is electrically connected to the robot 20, the force sensor 30, the input unit 50 and the camera 60, and is also communicatively connected to the user interface 40.

The robot 20 may be, for example, but not limited to, a single-axis or multi-axis robot, and the test object T is detachably attached to the robot 20. The server 10 controls the robot 20 to adjust the posture of the test object T and drive the test object T to move relative to a test platform 2. In order to briefly describe the operation of the test system 1 of the present invention, a multi-axis robot with multiple joints and multiple unretractable arms serves as the robot 20 to exemplify the description below, as shown in FIG. 2; and however, the present invention is not limited to this embodiment, and the design of the robot 20 depends on the requirements of the test task.

The force sensor 30 can be, for example, but not limited to, a multi-axis force sensor, and is used to detect the reaction force acting on the test object T. In this embodiment, one end of the force sensor 30 is connected to the robot 20, and the opposite end of the force sensor 30 is connected to the test object T. In order to briefly describe the operation of the test system 1 of the present invention, a six-axis force sensor capable of detecting translational forces Fx, Fy, and Fz and torsional forces (rotational force or torque) Mx, My, and Mz in the X-axis, Y-axis, and Z-axis serves as the force sensor 30 in the following exemplary description, as shown in FIG. 3; and however, the present invention is not limited to this embodiment, and the number and type of force sensors 30 depend on the needs of the test task.

In order to perform test tasks, at least one database can be pre-established in the storage unit of the server 10 to store program instructions, algorithms and parameters required for the processor of the server 10 in executing a test task to use. The information in a respective database can be determined, for example, but not limited to, according to the type of the test object T and the type of the test task. The type of the test object T can be, for example, but not limited to a shoe or a chair. The types of test tasks can be classified according to the type of the test object T, such as but not limited to an abrasion resistance test or a material strength test. In order to briefly describe the operation of the test system 1 of the present invention, the sole structure of a football shoe serves as a bottom structure of the test object T and the test task is the abrasion resistance test in the following exemplary description.

For the abrasion resistance test of the test object T, the test system 1 provided by the present invention can simulate the state of a real person performing various physical actions, such as but not limited to kicking a straight ball, tackling a ball, fast running, jogging, walking or standing, etc., after putting on shoes with this sole structure. At the same time, the test system 1 can also test the abrasion resistance of the studs on this sole structure of the test object T. To this end, the aforementioned at least one database can be pre-stored with various motion parameters, various weight parameters, one or more motion parameter sequences related to each motion parameter, various speed parameters, and various force preset values. The motion parameter is a parameter representing a preset simulation action. The weight parameter refers to the weight of a real person who wants to put on the shoes with the above-mentioned sole structure. A respective motion parameter sequence is planed based on the simulating of a physical action of human being. The motion parameter sequence includes at least an index of each joint of the robot 20 and each coordinate of each joint on a preset path for a preset simulation action. A respective speed parameter refers to a speed at which the robot 20 performs a preset simulation action. A respective force preset value refers to an expected reaction force acting on the test object T in one direction when the robot 20 drives the test object T to contact the test platform 2. A respective force preset value corresponds to a direction and is associated with a weight parameter, a motion parameter sequence, and a speed parameter. The number and types of force preset values depend on the force sensor 30 selected for use, and the test purpose. In addition, the corresponding relationship between the motion parameter sequence and the motion parameter and the corresponding relationships among the weight parameters, the motion parameter sequences, the speed parameters and the force preset values can also be stored in the aforementioned at least one database in advance. For the convenience of description, the force preset value is a preset value in the Z-axis direction.

The user interface 40 can be displayed on a display (not shown) connected to the server 10 to present one or more parameter input fields for a tester to input parameters through the input unit 50, and present one or more sensing result windows for the tester to watch and analyze the sensing result of the sensor. The input unit 50 can be, for example, but not limited to, a keyboard, a mouse, or a touchpad integrated in the display. The way of presenting the sensing result can be realized, for example, but not limited to, in the form of a graph or a numerical value. In this embodiment or other embodiments, the user interface 40 may further present one or more test result windows for the tester to observe and judge the test result. The test result can be obtained, for example, but not limited to, by using the camera 60 to shoot the test object T to obtain test images presenting the state of the sole. The test images generated by the camera 60 are sent to the processor of the server 10, so that the test images are displayed in the test result window of the user interface 40 through the processor.

For the example of testing the abrasion resistance of the shoe sole by kicking straight balls, the tester can set kicking straight balls as a preset simulation action (that is, setting a motion parameter), set the weight (that is, setting a weight parameter), speed (that is, setting a speed parameter) and time (that is, set a length of test time) for performing this preset simulation action, and set a force value in the Z-axis direction as a force setting value (that is, setting a force preset value) through the aforementioned user interface 40 and the input unit 50. At this time, the processor of the server 10 can know the motion parameter corresponding to the preset simulation action and a force preset value matching the force setting value, and search the storage unit for a motion parameter sequence corresponding to the above setting.

Then, according to the speed parameter and the length of test time set and the motion parameter sequence found, the processor of the server 10 can control the robot 20 to adjust the posture of the test object T and drive the test object T to move with respect to the test platform 2, so that the bottom structure of the test object T rubs against the surface of the test platform 2. At the same time, the processor of the server 10 also controls the force sensor 30 to detect 6 kinds of reaction forces acting on the object T, namely the translational force Fx in the X-axis direction, the translational force Fy in the Y-axis direction, the translational force Fz in the Z-axis direction, the torsional force Mx in the X-axis direction, the torsional force My in the Y-axis direction, and the torsional force Mz in the Z-axis direction, so as to generate a sensing feedback signal.

When the processor of the server 10 receives the sensing feedback signal provided by the force sensor 30, the processor compares the translational force Fz indicated by the sensing feedback signal, with the previously-found force preset value to adjust at least one parameter related to the Z-axis direction in the motion parameter sequence or adjust the speed parameter, so as to adjust the degree to which the robot 20 drives the test object T to move with respect to the test platform 2. For example, the abrasion resistance of the studs on the sole structure of the test object T is tested under the same preset simulation action, the studs on the test object T get worn gradually over time, so that the resistance acting on the test object T in the Z-axis direction is also gradually reduced, causing the translational force Fz in the Z-axis direction to be lower than the force preset value corresponding the Z-axis direction; this means that under the current motion parameter sequence, the degree to which the robot 20 drives the test object T to press the test platform 2 downward in the Z-axis direction is no longer enough, so the processor of the server can adjust the coordinates associated with the Z-axis in the motion parameter sequence to increase the degree to which the robot 20 drives the test object T to press the test platform 2 downward in the Z-axis direction.

In summary, the test system 1 of the present invention can obtain a feedback signal through the force sensor 30, thereby updating the parameters planed for controlling the robot 20, so that the movement of the test object T relative to the test platform 2 can still automatically conform to the preset setting over time, and the resistance acting on the test object T contacting on the test platform 2 will not be unexpectedly weakened over time.

The motion parameter sequence adopted by the test system 1 of the present invention is planed by simulating a body motion of human being, so the movement of the robot 20 may look like the body motion of a real person, and the test system 1 can simulate the situation where a real person is using the product to which the test object T is applied. Through such a realistic test, the characteristics of the test object T may be more realistically reflected.

Moreover, the test system 1 of the present invention can display the 6 reaction forces indicated by the sensing feedback signal on the user interface 40, so that the tester can observe the changes in the sensing results over time to determine the changes in the forces acting on the test object T under the same preset simulation action and force setting value, so as to analyze the material properties of the sole structure.

In addition, the test system 1 of the present invention can also display the test images taken by the camera 60, on the user interface 40, so that the tester can observe the wear of the sole structure in the test images, or use the image analysis technology to automatically analyze the wear and tear of the sole structure.

Although the present invention is disclosed in the foregoing embodiments, these embodiments are not intended to limit the present invention. Without departing from the spirit and scope of the present invention, all modifications and combinations of various implementation modes are within the scope of patent protection of the present invention. For the scope of protection defined by the present invention, please refer to the attached claims.

What is claimed is:

1. A test system with detection feedback, suitable for working with a robot, to which a test object is attached, and the test system comprising:
    a force sensor configured to be installed on the robot to detect at least one reaction force on the test object, so as to generate a sensing feedback signal; and
    a server electrically connected to the robot and the force sensor, and configured to:
    according to a force setting value corresponding to a direction, control the robot to drive the test object to move so that the test object contacts a test platform;
    receive the sensing feedback signal of the force sensor to compare the reaction force corresponding to the direction and indicated by the sensing feedback signal, with the force setting value; and
    when the reaction force corresponding to the direction does not match the force setting value, adjust a degree to which the robot drives the test object to move relative to the test platform in the direction, so that the reaction force corresponding to the direction matches the force setting value;
    wherein the server further controls a motion of the robot according to a motion parameter sequence, the motion parameter sequence includes at least one parameter associated with the direction, and when the reaction force corresponding to the direction does not match the force setting value, the server adjusts the at least one parameter associated with the direction, so as to adjust the degree to which the robot drives the test object to move relative to the test platform;
    the motion parameter sequence is designed to simulate a body motion of human being;
    the motion parameter sequence is planed based on simulating of a physical action of human being, the motion parameter sequence includes at least an index of each joint of the robot and each coordinate of each joint on a preset path for a preset simulation action.

2. The test system with detection feedback as claimed in claim 1, wherein the server adjusts a movement speed of the robot, thereby adjusting the degree to which the robot drives the test object to move relative to the test platform in the direction.

3. The test system with detection feedback as claimed in claim 1, wherein the force sensor is a multi-axis force sensor.

4. The test system with detection feedback as claimed in claim 1, wherein the force sensor is a 6-axis force sensor.

5. The test system with detection feedback as claimed in claim 1, further comprising a user interface communicatively connected to the server to present information associated with the at least one reaction force.

6. The test system with detection feedback as claimed in claim 3, further comprising a camera electrically connected to the server for shooting the test object to generate a test image and provide the test image to the server, so that the server displays the test image on the user interface.

* * * * *